United States Patent
Szczepanek

(10) Patent No.: US 8,684,391 B2
(45) Date of Patent: Apr. 1, 2014

(54) HOOK COUPLING

(75) Inventor: Udo Szczepanek, Eichenau (DE)

(73) Assignee: Jost-Werke GmbH, Neu-Isenburg (DE)

( * ) Notice: Subject to any disclaimer, the term of this patent is extended or adjusted under 35 U.S.C. 154(b) by 912 days.

(21) Appl. No.: 12/673,373

(22) PCT Filed: Aug. 11, 2008

(86) PCT No.: PCT/EP2008/006611
§ 371 (c)(1),
(2), (4) Date: May 6, 2010

(87) PCT Pub. No.: WO2009/021709
PCT Pub. Date: Feb. 19, 2009

(65) Prior Publication Data
US 2011/0209310 A1    Sep. 1, 2011

(30) Foreign Application Priority Data
Aug. 13, 2007  (DE) .......................... 10 2007 038 142

(51) Int. Cl.
F16B 45/02    (2006.01)
(52) U.S. Cl.
USPC .......... 280/504; 24/599.5; 24/598.7; 280/507
(58) Field of Classification Search
USPC ......... 280/504, 507, 280, 509, 461, 477, 515; 172/272; 182/439
See application file for complete search history.

(56) References Cited

U.S. PATENT DOCUMENTS 2,426,532 A    8/1947  Tierney
2,766,995 A  * 10/1956 Weiss ........................... 280/504

(Continued)

FOREIGN PATENT DOCUMENTS

DE         17 17 113 U      2/1958
DE    11 2004 000 916 T5    4/2006
FR           1527021 A       5/1968

OTHER PUBLICATIONS

Data Sheet RO*231-40mm (2 pgs.), 2001.

(Continued)

Primary Examiner — Tony Winner
Assistant Examiner — Jacob Knutson
(74) Attorney, Agent, or Firm — Rothwell, Figg, Ernst & Manbeck, P.C.

(57) ABSTRACT

A hook coupling with a hook body (12), which has a hook-in opening (14), and with a closure latch (16) which can be adjusted between an open position and a closed position furthermore comprises: a blocking lever (26) which is displaceable between a blocking position, in which it blocks an adjustment of the closure latch (16) from the closed position towards the open position, and a release position in which it permits an adjustment of the closure latch (16) from the closed position towards the open position, and a triggering device (36) which, in its basic position, whenever blocking lever (26) is in the blocking position, prevents displacement of the blocking lever (26) into the release position, and which, when actuated out of its basic position, permits displacement of the blocking lever (26) into the release position. The triggering device (36) furthermore comprises a triggering component (38) which is mounted moveably on the closure latch (16) or preferably on the hook body (12) or on a component connected rigidly to the hook body (12) or the closure latch (16) and which is moveable between the basic position and a triggering position in which it permits the displacement of the blocking lever (26) into the release position.

30 Claims, 9 Drawing Sheets

(56) References Cited

U.S. PATENT DOCUMENTS

Figure 6:
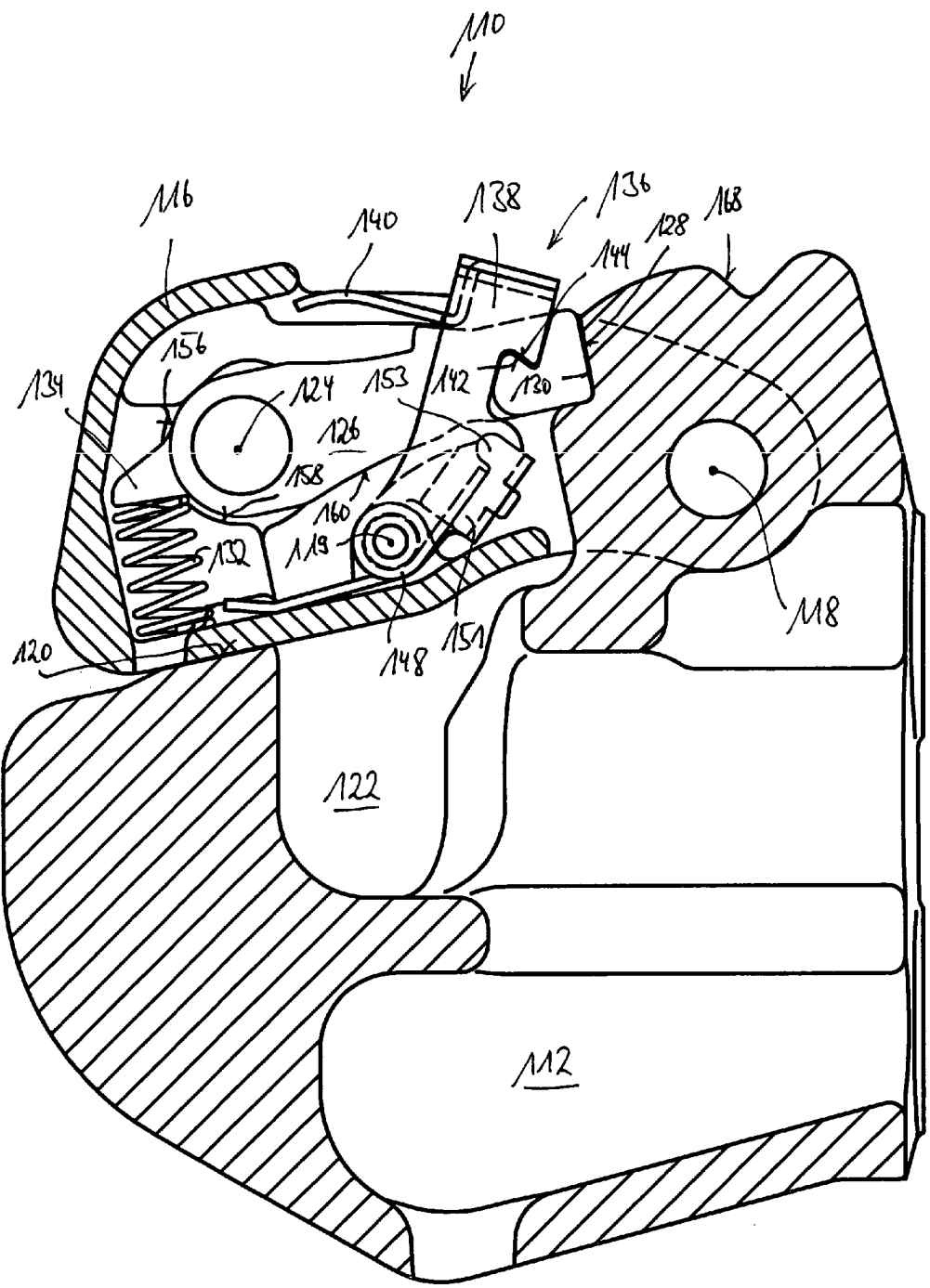

| | | | |
|---|---|---|---|
| 2,842,380 A | | 7/1958 | Weiss |
| 3,475,037 A | | 10/1969 | Weiss |
| 4,721,324 A | | 1/1988 | Blacklaw |
| 4,758,015 A | | 7/1988 | Pixley |
| 4,958,848 A | * | 9/1990 | Nash .............................. 280/509 |
| 5,033,764 A | | 7/1991 | Blacklaw |
| 2004/0239077 A1 | * | 12/2004 | Terpsma et al. ............... 280/504 |

OTHER PUBLICATIONS

Data Sheet RO*283-76mm (2 pgs.), 2001.

* cited by examiner

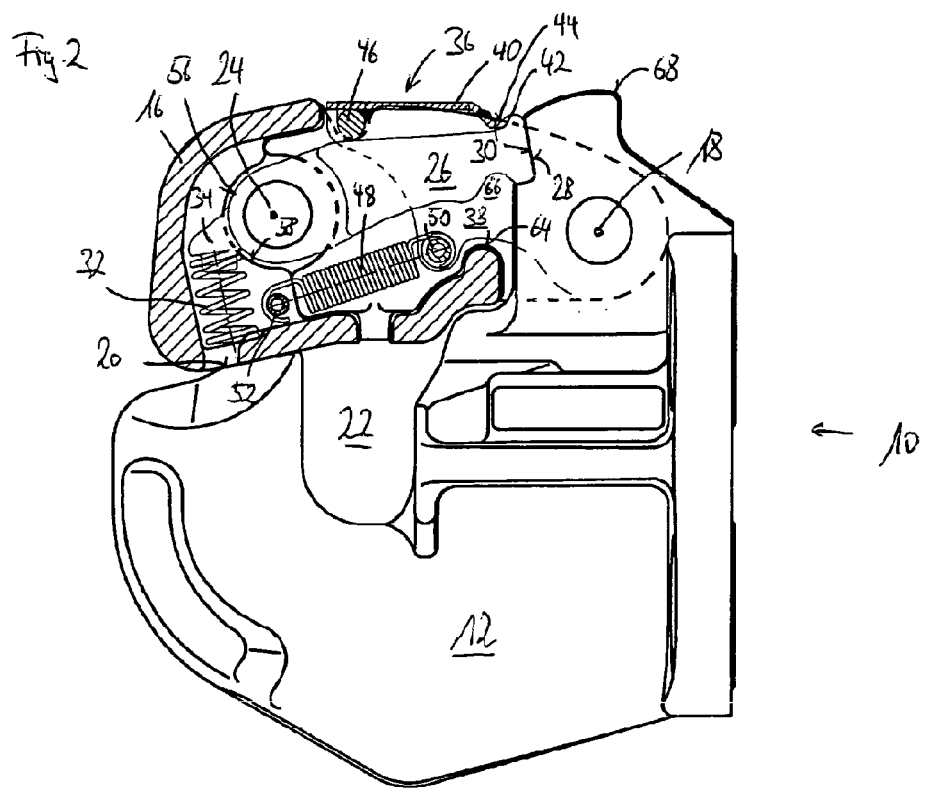
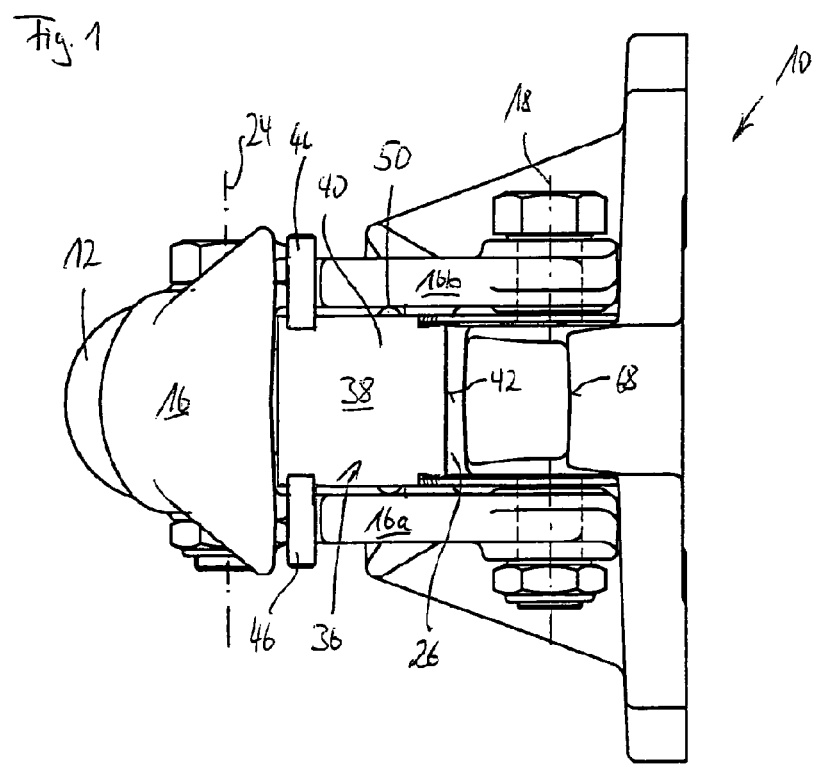

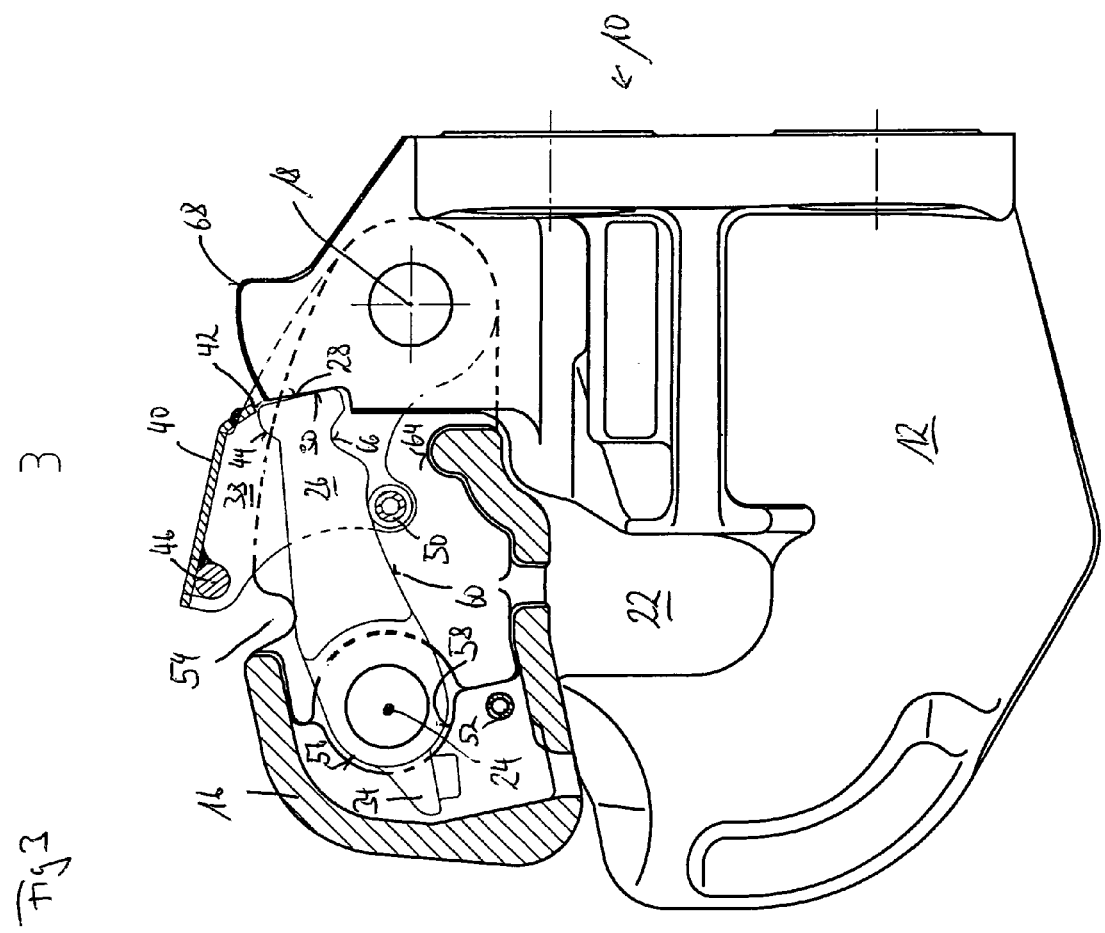

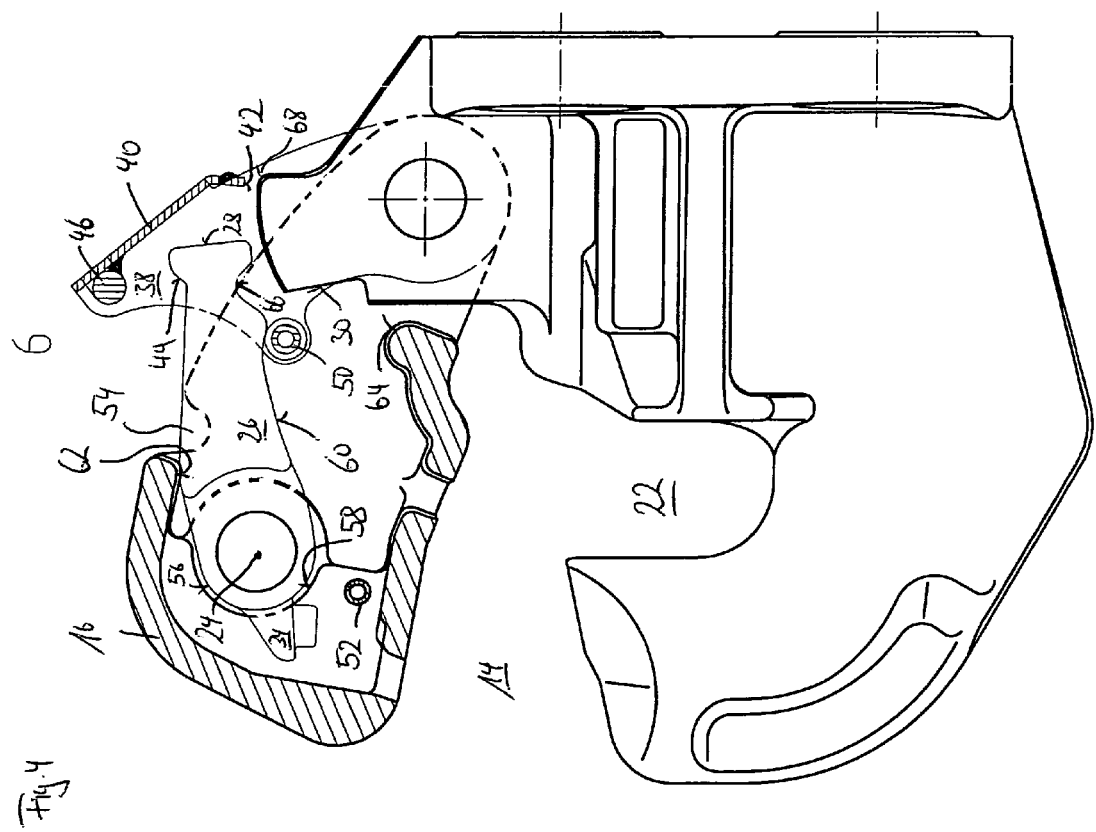

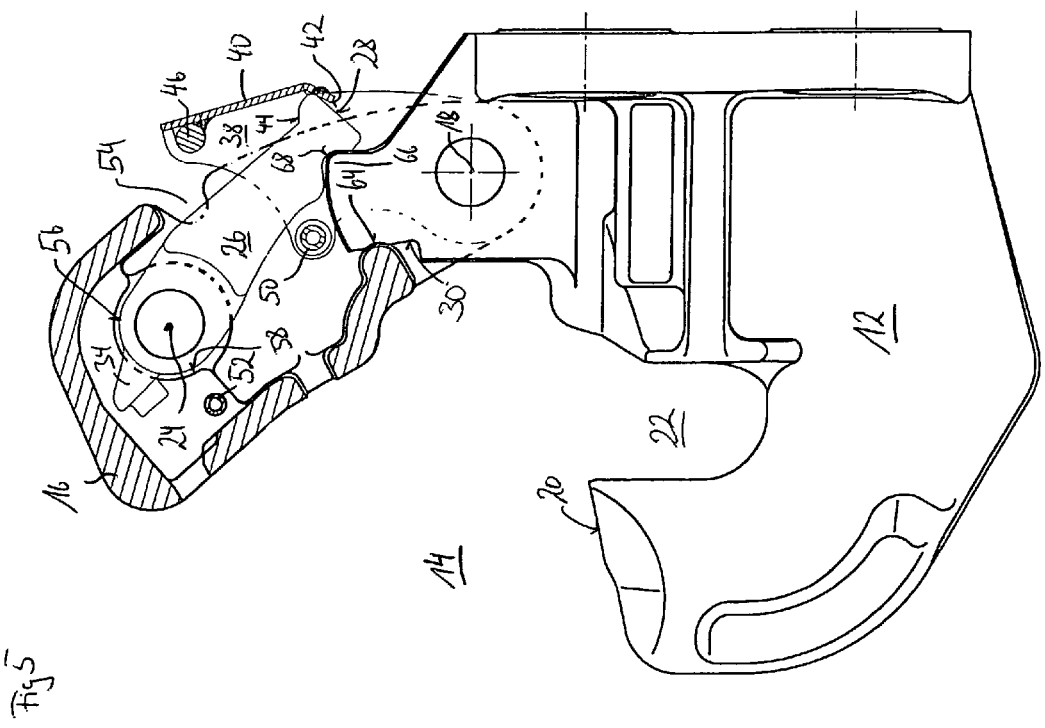

HOOK COUPLING

CROSS REFERENCE TO RELATED APPLICATION

This application is a 35 U.S.C. 371 National Phase Entry Application from PCT/EP2008/006611, filed Aug. 11, 2008, which claims the benefit of German Patent Application No. 10 2007 038 142.7 filed on Aug. 13, 2007, the disclosure of which is incorporated herein in its entirety by reference.

The present invention relates to a hook coupling with a hook body, which has a hook-in opening, and with a closure latch which can be adjusted between an open position, in which the hook-in opening is at least open to such an extent that a drawbar eye can be hooked in at the hook body, to establish a positive connection therewith, and a closed position in which the hook-in opening is closed at least to such an extent that a drawbar eye hooked in at the hook body is secured to stay thereon, the hook coupling furthermore comprising: a blocking lever which is displaceable between a blocking position, in which it blocks an adjustment of the closure latch from the closed position towards the open position, and a release position in which it permits an adjustment of the closure latch from the closed position towards the open position, and a triggering device which, in its basic position, whenever the blocking lever is in the blocking position, prevents displacement of the blocking lever into the release position, and which, when actuated out of its basic position, permits displacement of the blocking lever into the release position.

Such a hook coupling is known for example from US 2004/0239077 A1. In this known hook coupling, the triggering device is moveably mounted on the blocking lever, the triggering device being supported on the closure latch and thus prevents movement of the blocking lever out of the blocking position towards the release position.

A disadvantage of the known hook coupling is on the one hand the cumbersome operation, since for opening the hook coupling, that is for adjusting the closure latch into the open position, the triggering device must first of all be actuated in a first direction and the blocking lever has to be moved in the same first direction, whereupon after the displacement of the blocking lever into the release position the closure latch that supports the blocking lever has to be adjusted in the opposite direction towards the open position.

On top of this, there seems to be room for improvement for the operational safety of the known hook coupling. To be precise: if a pivoting shaft should break that supports the blocking lever for pivoting, the blocking lever can move out of its blocking position just like that and lose its blocking effect.

The object of the present invention is therefore to further develop a hook coupling of the generic type in such a way that it can be actuated more simply in conjunction with increased operational safety.

According to the invention, this object is achieved by a hook coupling mentioned initially, where the triggering device exhibits a triggering component which is mounted moveably on the closure latch or preferably on the hook body or on a component connected rigidly to the hook body or the closure latch and which is moveable between the basic position and a triggering position in which it permits the displacement of the blocking lever into the release position.

Due to the fact that the triggering device is no longer mounted, as in the above-mentioned prior art, on the blocking lever whose movement out of the blocking position it is intended to prevent, failure of the blocking-lever mounting no longer necessarily leads to the end of the blocking effect of the blocking lever. Even in the case of a failure of the blocking-lever mounting, the hook coupling can thus be held safely in a coupling state in which a drawbar eye is hooked in on the hook body.

According to the type of attachment of the triggering component and its moveability, the operability of the hook coupling, in particular for adjusting the closure latch into the open position, can be simplified by moveably mounting the triggering component on the closure latch or preferably on the hook body.

The positions, mentioned in this application, of individual components of the hook coupling are often characterized in that that they permit or prevent movement of the same or of a another component. Here, "position" is not to be understood as a position that is defined unambiguously or can even be latched, but is to be assessed according to the invention only in terms of its attribute, whether it permits or prevents the movement, that is denoted according to the definition, of the component that is likewise denoted.

Preferably the triggering component is moveably mounted on the hook body, since the hook body, as a massive component, can absorb even strong forces without any problems.

In principle, it can be envisaged to provide the triggering component so that it can be moved in any way on the closure latch or on the hook body. Particularly preferably, it is provided pivotably on the closure latch or preferably on the hook body so that it can be moved easily. At the same time, the triggering component can be pivoted at least from the basic position into the triggering position. As has been explained further below, it can however also be envisaged to provide the triggering component so that it can be pivoted away from the basic position beyond the triggering position.

To increase the operational safety of the hook coupling, it can be provided that the triggering component is pretensioned into the basic position by a force that acts. As a result, movement of the triggering component into the basic position, that secures the coupling state of the hook coupling, is at least supported or even initiated automatically.

For this purpose, seen from the point of view of construction, the hook coupling can comprise at least one triggering-component pretensioning spring that is supported with one end on the triggering component and with the other end on a component composed of blocking lever, hook body, or closure latch, preferably on the closure latch.

Preferably the triggering-component pretensioning spring is supported on the closure latch since then it is moved jointly with the closure latch and thus does not interfere with the hook-in opening.

According to the required pretensioning force, even two or more triggering-component pretensioning springs can be provided.

To increase the operational safety further, it can be envisaged that the triggering component can not be moved into its basic position unless the blocking lever is in the blocking position.

To ensure a moveability of the blocking lever that is as simple as possible but also robust, even this lever is preferably designed so as to be pivotable between the blocking position and the release position. At the same time, it makes sense for the blocking lever to be mounted pivotably in the closure latch, so that it can then be safely brought into its blocking position if the closure latch is in its closed position.

In principle, the triggering component and the blocking lever can be provided in the hook coupling so that they can be pivoted in the same sense. Pivoting the triggering component and the blocking lever with the same sense of rotation is advantageous above all if the triggering component is hinged on the closure latch since when the triggering component and the blocking lever have the same sense of rotation, their respective pivoting axes can be arranged close to each other, so that the small installation place available in the closure latch is sufficient for movement of the triggering component and the blocking lever.

The triggering component and the blocking lever are then classified as being pivotable in the same sense, if the triggering component, for movement from the basic position into the triggering position, is pivoted in the same direction of rotation as the blocking lever from the blocking position into the release position.

As will be explained further below and when considering several aspects, it is advantageous if the blocking lever and the triggering component can be pivoted in opposite directions. Advantageously, the blocking lever and the triggering component can be pivotable independently of the respective sense of rotation about a blocking-lever pivoting axis and a triggering-component pivoting axis parallel thereto, so as to reduce the required installation space.

So as to lock the blocking lever mechanically in its blocking position in a particularly safe way, it can be provided in terms of construction that the triggering component has a locking section that is arranged, in the basic position of the triggering component, so as to achieve a positive locking by confronting or resting on a locking counter-section of the blocking lever. If the triggering component is adjusted into the triggering position, the locking section is then remote from the locking counter-section so that the locking section then no longer impedes the movement of the locking counter-section in a positive manner.

A particularly high degree of operational safety of the hook coupling against it opening in an undesired manner can be achieved in that the basic position of the triggering component, self-locking is achieved between the blocking lever and the triggering component such that movement of the blocking lever from the blocking position towards the release position does not cause any movement of the triggering component from the basic position towards the triggering position. This desired self-locking can be achieved in a particularly simple manner in the case of the above-mentioned pivotability of triggering component and blocking lever in opposite senses.

If, as has already been indicated above, the mounting of the blocking lever fails, for example by a pivoting shaft or axis of the blocking lever breaking, a desired blocking effect of the blocking lever can still be ensured when the hook coupling is closed (closure latch is located in the closed position), if the blocking lever is designed so as to be partly rotationally-symmetric relative to the blocking-lever pivoting axis at its longitudinal end that is closer to the blocking-lever pivoting axis and this longitudinal end is surrounded over a predetermined angular range by an essentially complementary recess in the component that mounts the blocking lever. At the same time, the longitudinal end of the blocking lever that is closer to the blocking-lever pivoting axis can have a part-cylindrical, part-spherical and part-conical design and the like. The complementary recess is preferably situated close to the boundary face, facing towards it, of the partly rotationally-symmetric longitudinal end, preferably forming a gap of very small gap width, for example from 0.5 to 2.5 mm.

The contact angle across which the complementary recess surrounds the partly rotationally-symmetric longitudinal end should be selected such that the contact does not interfere with the desired moveability of the blocking lever. Since however a pivotable blocking lever has to be pivoted between its blocking position and its release position by only a few angular degrees, preferably a contact angle of 140° to 180°, preferably from 160° to 180°, can be selected so as to ensure the desired blocking effect even if the blocking-lever pivoting axis or shaft should be broken. Contact angles higher than 180° can also be envisaged when the blocking lever has been constructed accordingly.

For a safe desired displacement of the blocking lever from its blocking position into its release position while at the same time being very simple to operate, it can be envisaged that the triggering component exhibits a cam device that, at least during a section of a pivoting movement of the triggering component away from the basic position, entrains the blocking lever from the blocking position in the direction towards the release position. The cam device is preferably designed and provided on the triggering component in such a way that the blocking lever can be displaced by the triggering component from the blocking position into the release position by means of the cam device.

To reduce the number of components necessary for the formation of the hook coupling discussed here, it can be envisaged that the cam device serves a pretensioning spring bearing on the side of the triggering component.

To ensure the displacement of the blocking lever from its blocking position towards its release position, it can be envisaged in terms of construction that the cam device exhibits a sliding face that, at least during a section of the pivoting movement of the triggering component from the basic position into the triggering position, arrives in a sliding-contact engagement on a contact contour of the blocking lever. It is very simple to realise such a sliding-contact engagement without any additional components.

It can be basically envisaged that the closure latch can be moved randomly between its closed position and its open position. Preferably however, also the closure latch is provided pivotably on the hook body or on a component rigidly connected thereto. At the same time the number of components necessary for manufacturing the hook coupling can be kept low if the closure latch and the triggering component can be pivoted about a joint pivoting axis. If this is not the case, the hook coupling can be realised even in the case of a small installation space, if the closure-latch pivoting axis, the blocking-lever pivoting axis and the triggering-component pivoting axis are parallel to each other.

So as to increase the operational safety, the blocking lever can be pretensioned towards the blocking position.

The blocking lever can furthermore exhibit a latching contour that is designed to latch with a counter-latching contour formed on the hook body, if the closure latch reaches its open position. As a result the closure latch can be advantageously maintained in its open position without additional components. The latching contour is preferably provided on the blocking lever such that the pretensioning force that acts on the blocking lever and pretensions it towards the blocking position can also be utilised for ensuring the latching, in particular the latching that can be overridden.

So that the closure latch can be actuated particularly simply by the triggering component, they are preferably provided such that the triggering component on being actuated is pivoted from the basic position into the triggering position and possibly beyond this in the same sense of rotation as the closure latch from the closed position into the open position during its adjustment.

Due to the cam facility described above, the closure latch can be pivoted from its closed position into its open position solely by a single-handed actuation engagement on the triggering component, if the closure latch comprises a mechanical stop that limits the displacement range of the blocking lever close to the release position against movement away from the blocking position.

In this case, at first the triggering component is brought from its basic position into its triggering position so that the blocking lever is no longer fixed in its blocking position. Then the triggering lever is moved out of the basic position beyond the triggering position until the cam device has arrived in the above-described sliding-contact engagement with the contact contour of the blocking lever. If, starting from this state, the triggering lever is moved still further out of the basic position the blocking lever is entrained by the cam device and brought from its blocking position into its release position during the movement of the triggering component.

If the triggering component is ultimately moved until the blocking lever contacts the mechanical stop just mentioned, the closure latch, the blocking lever and the triggering component are braced relative to each other so that the closure latch as a whole is pivoted in the same sense with the triggering component when the triggering component is moved further away from the basic position.

Against excessive opening while at the same time protecting a counter stop face of the hook body that is provided for the blocking lever for ensuring its blocking effect, it can be envisaged that the counter stop face of the hook body, by means of which face a stop face of the blocking lever is brought into a contact engagement in its blocking position, is also designed for contact of a contact section of the closure latch thereon, to be precise such that the counter stop face limits the adjustability of the closure latch close to the open position in the direction away from the closed position.

Figure 7:
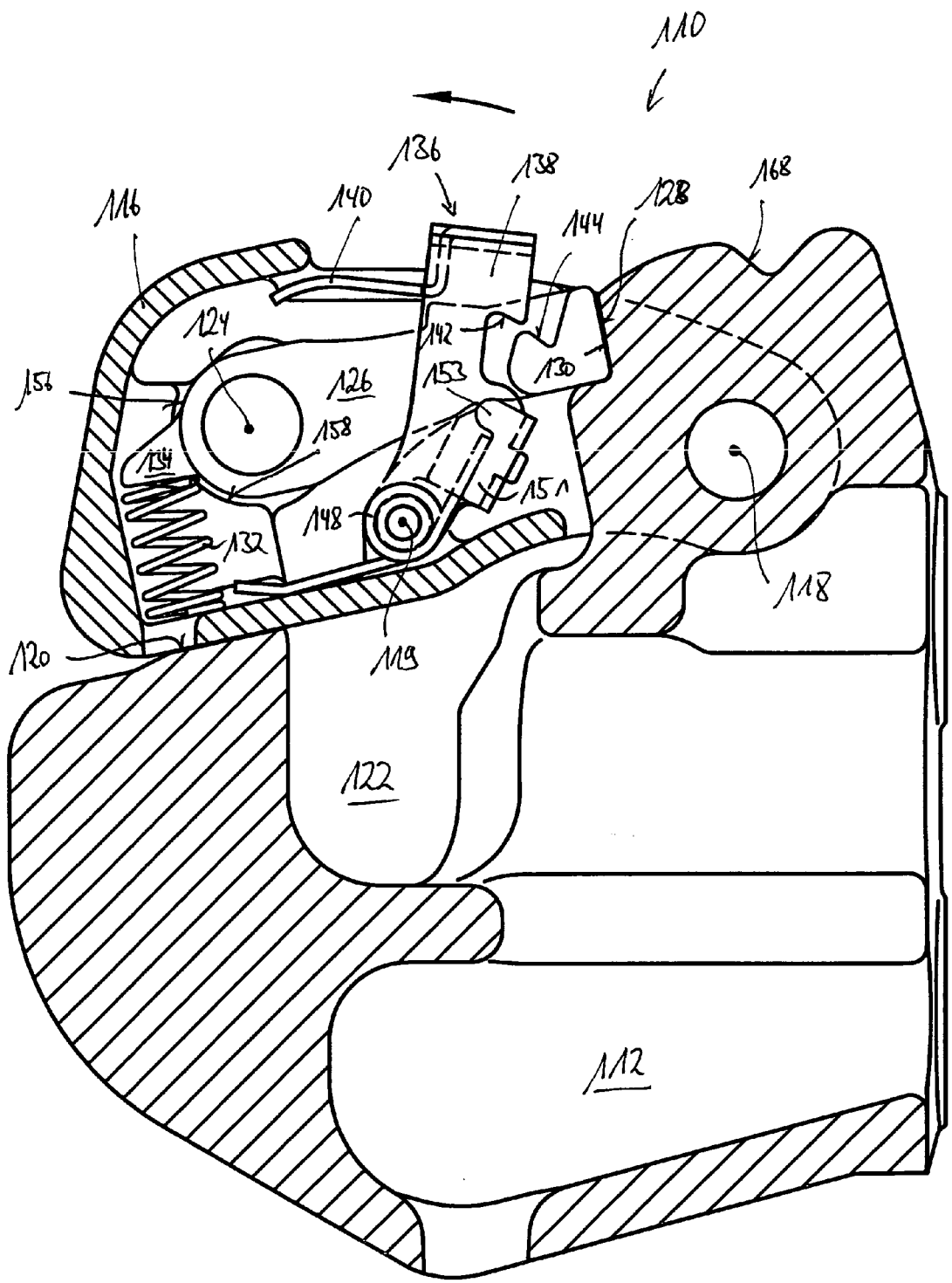
Figure 8:
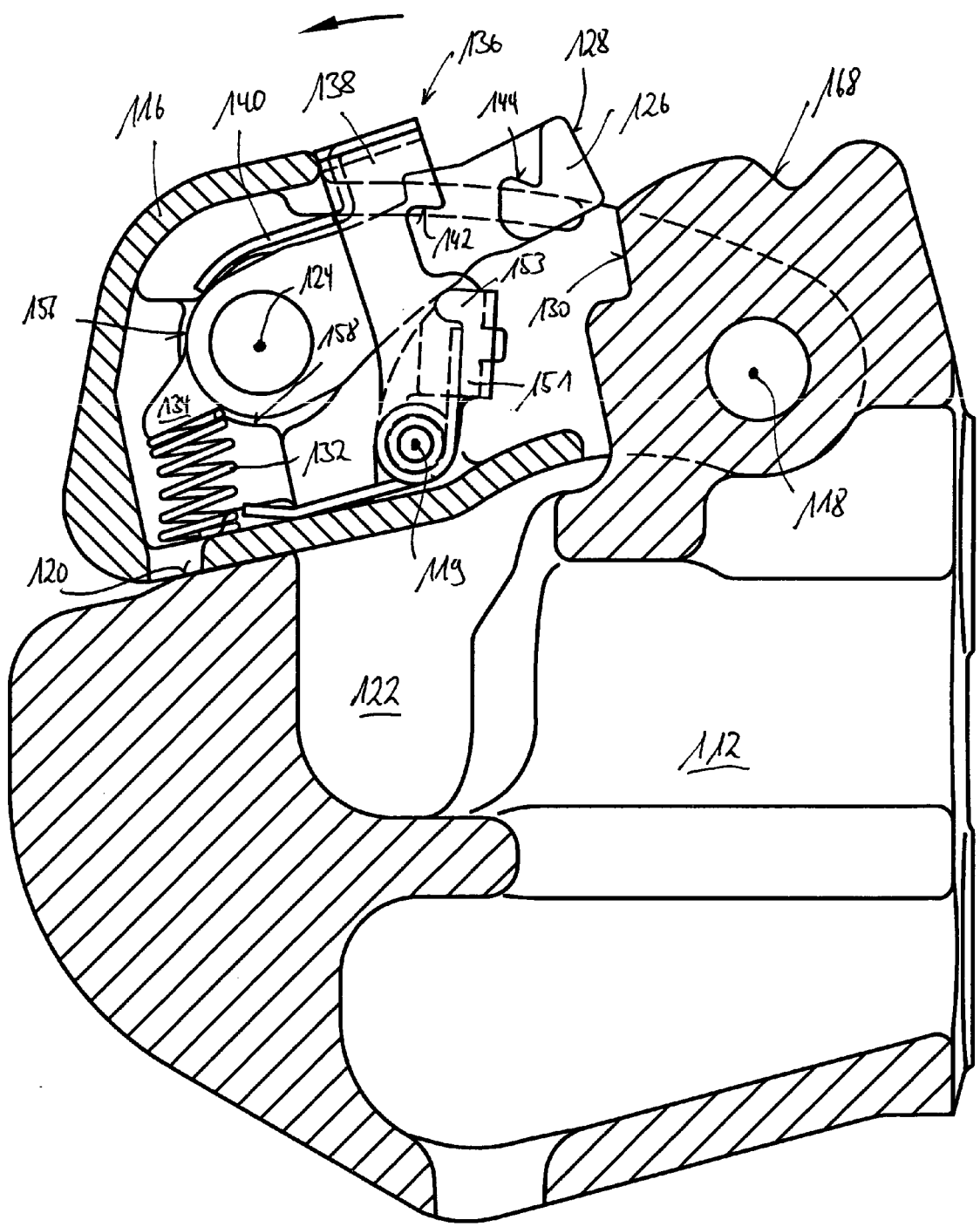
Figure 9:
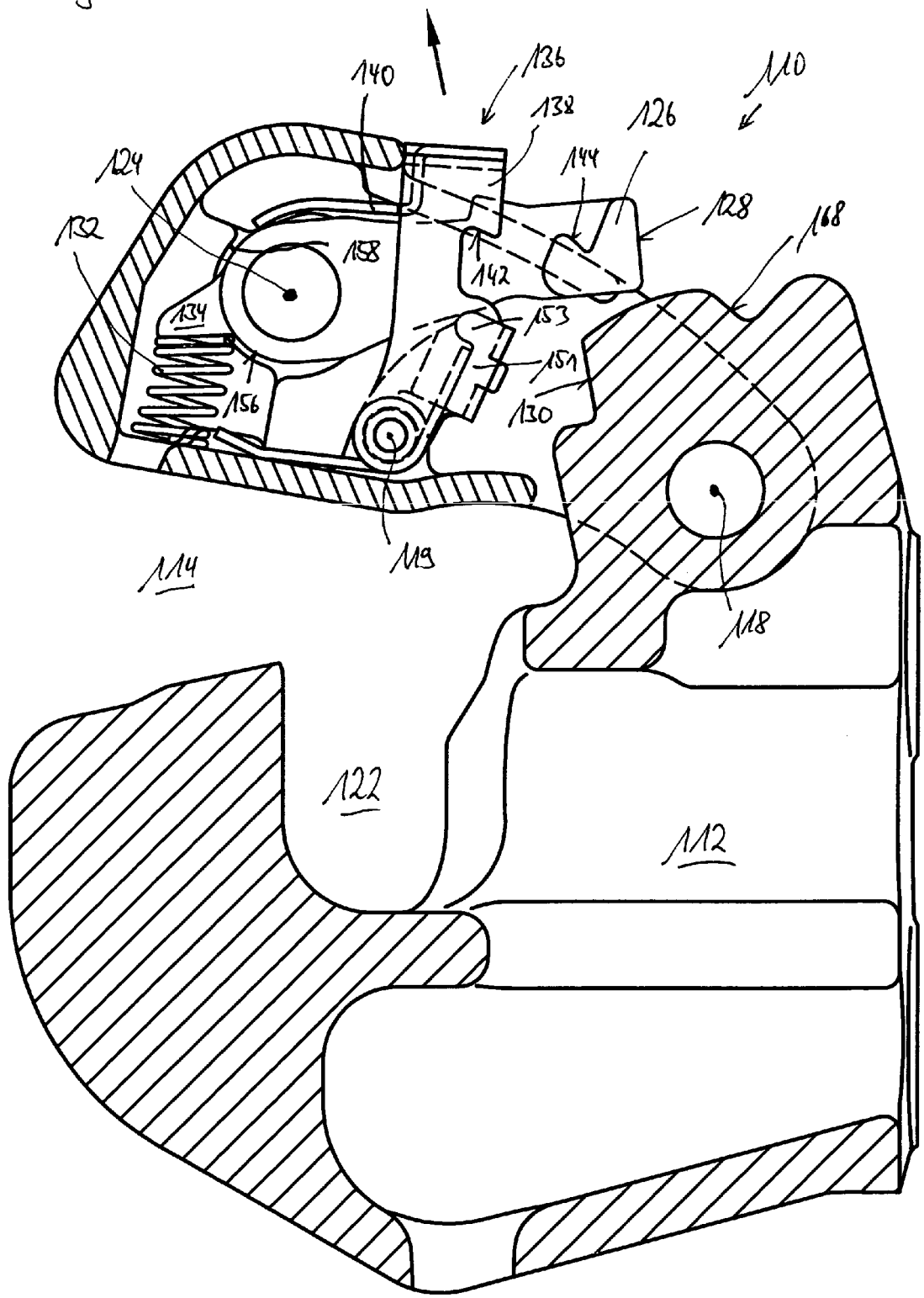
Figure 10:
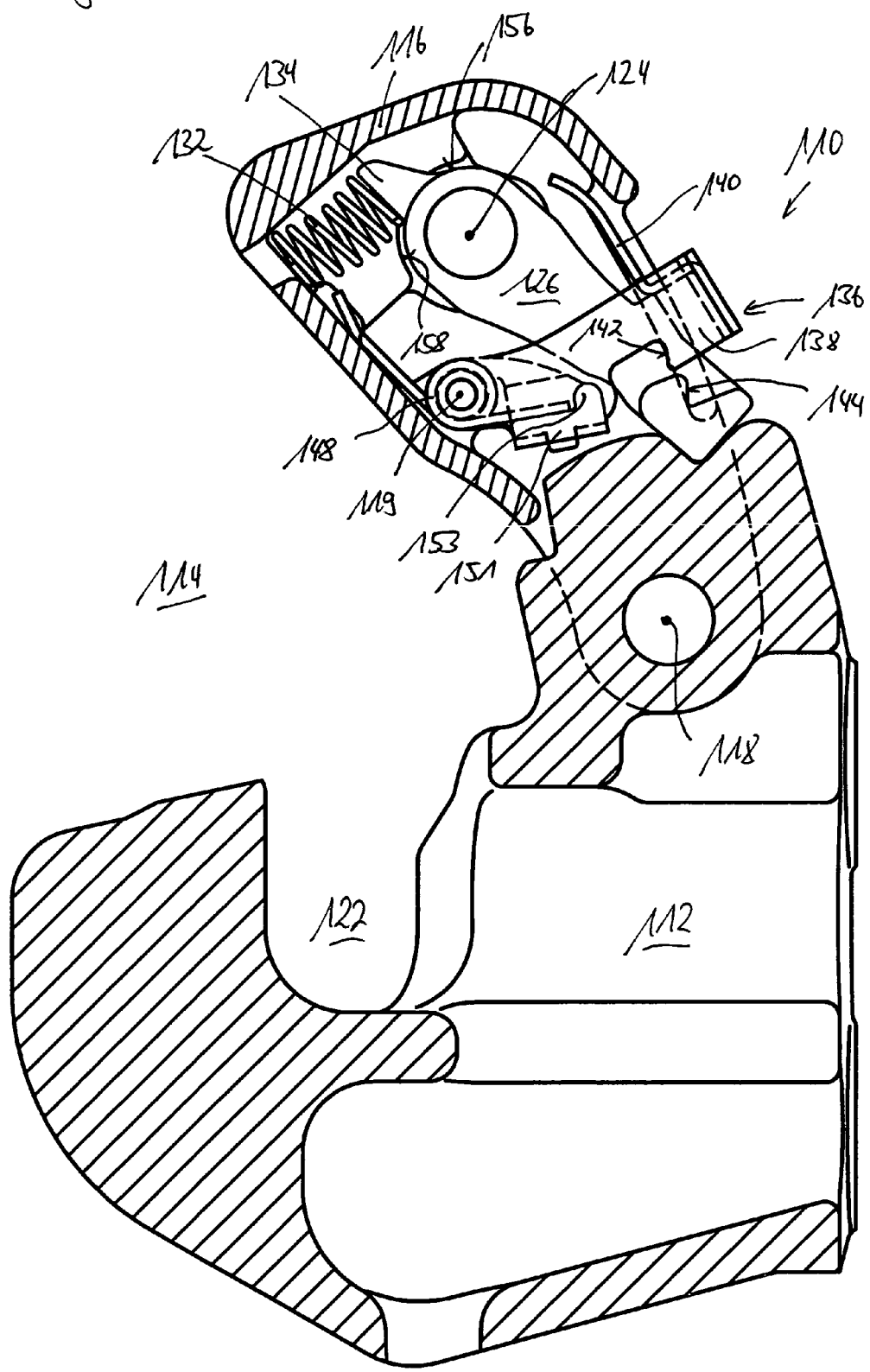

The present invention is explained in more detail below with reference to an exemplary embodiment, in which:

FIG. 1 shows a top view of an inventive first embodiment of a hook coupling,

FIG. 2 shows a part-sectional view of the hook coupling of FIG. 1 with the closure latch in the closed position, FIG. 3 shows a part-sectional view of the hook coupling of FIGS. 1 and 2 at the start of an opening process for opening the hook coupling, FIG. 4 shows the hook coupling of FIGS. 1 to 3 with an opening actuation that has progressed, FIG. 5 shows the hook coupling of FIGS. 1 to 4 with the closure latch in the open position, FIG. 6 shows a part-sectional view corresponding to FIG. 2 of an inventive second embodiment of a hook coupling, FIG. 7 shows a part-sectional view of the hook coupling of FIG. 6 at the start of an opening process for opening the hook coupling, FIG. 8 shows the hook coupling of FIGS. 6 and 7 with a triggering component at a maximum distance from its basic position, FIG. 9 shows the hook coupling of FIGS. 6 to 8, the closure latch being positioned between its closed position and its open position, and FIG. 10 shows the hook coupling of FIGS. 6 to 9 with the closure latch in the open position.

In FIGS. 1 to 5, an inventive hook coupling is generally designated by 10. It comprises a hook body 12 with a hook-in opening 14 (see FIGS. 4 and 5) and with a closure latch 16 that is hinged on the hook body so that it can pivot. To be more precise, the closure latch 16 is provided on the hook body 12 so that it can be pivoted about a closure-latch pivoting axis 18.

In the closed position, shown in FIG. 2, of the closure latch 16 in which it rests on a resting face 20 of the hook body 12 and thus closes the hook-in opening 14, the hook body 12 and the closure latch 16 define a through opening 22 in which a drawbar eye of a tailing vehicle can be received.

A blocking lever 26 is hinged on the closure latch 16 that can be pivoted about a blocking-lever pivoting axis 24 parallel to the closure-latch pivoting axis 18.

As shown in FIG. 2, the blocking lever 26 is situated in its blocking position, that is to say an end-side stop face 28 contacts a counter stop face 30 of the hook body. As a result, the closure latch 16 cannot be pivoted out of its closed position, shown in FIG. 2, in the clockwise direction.

The blocking lever 26 is pretensioned into the blocking position shown in FIG. 2 by means of a compression spring 32 that is tensioned between the closure latch 16 and a tensioning extension 34 of the blocking lever 26. For reasons of clarity, the compression spring 32 is only shown in FIG. 2 and omitted in FIGS. 3 to 5.

The hook coupling 10 furthermore comprises a triggering device 36 that can be pivoted on the hook body 12 about the pivoting axis 18. It comprises a lever-like triggering component 38. In FIG. 2, the triggering component 38 is shown in its basic position in which it prevents movement of the blocking lever 26 out of its blocking position.

For this purpose, the triggering component 38 has in a lid part 40 a locking section 42 that is arranged opposite a locking counter-section 44 of the blocking lever 26. The locking counter-section 44 is modelled such that it follows an envelope at a distance that is generated by the locking section 44 when the triggering component 38 is pivoted from the basic position into the triggering position.

For simple handling, the triggering device 36 exhibits handles 46 that protrude in the lateral direction.

To increase the operational safety, the contact component 38 is pretensioned into the basic position shown in FIG. 2 by a tension spring 48. The tension spring is fixed on the side of the triggering component on a bar 50 that penetrates the triggering component 38 and is fixed with its other longitudinal end on a spring abutment 52 that is fixed on the closure latch. For reasons of clarity, the tension spring 48, too, is only shown in FIG. 2 and omitted in FIGS. 3 to 5.

For receiving the handles 46, depressions 54 are provided in the side legs 16a and 16b of the closure latch 16 (see in particular FIGS. 3 to 5).

As can be seen in FIGS. 2 to 5, the longitudinal end of the blocking lever 26 close to the blocking-lever pivoting axis is formed as a part cylinder, the cylinder axis of the part cylinder coinciding with the blocking-lever pivoting axis 24.

A likewise part-cylindrical recess 58 is formed in the closure latch with a small gap distance from the part-cylindrical formation 56 of the blocking lever 26 and surrounds the part-cylindrical formation 56 of the blocking lever 26 over an angle of approximately 170°. The gap width between the part-cylindrical formation 56 of the blocking lever 26 and the part-cylindrical recess 58 in the closure latch amounts to between approximately 0.5 and 2.5 mm.

In case the pivoting mounting of the blocking lever 26 should break, the part-cylindrical recess 58 of the closure latch 16 holds the blocking lever 26 approximately in its blocking position shown in FIG. 2, so that the desired blocking effect of the blocking lever 26 is maintained even in the case of a broken pivoting axis or pivoting shaft of the blocking lever 26.

Using the FIGS. 2 to 5, a procedure is now explained for opening the hook coupling 10.

For this purpose, starting from the closed position of the hook coupling 10, shown in FIG. 2, the handles 46 of the triggering component 38 are grasped and the triggering component 38 in FIG. 2 is pivoted in the clockwise direction. At the same time, the position shown in FIG. 3 is arrived at. Here the triggering component 38 has already exceeded its triggering position in which the blocking lever 26 is no longer fixed by the locking section 42. Moreover, the bar 50 that in addition to being a spring abutment for the tension spring 48 also serves as a cam device has reached a sliding-contact engagement with a contact contour 60 of the blocking lever 26 (see in particular FIGS. 3 and 4). Due to this sliding-contact engagement, the blocking lever 26 was lifted slightly compared to its blocking position in FIG. 2, it still unfolding a blocking effect since its stop face 28 rests on the counter stop face 30 of the hook body 12.

If the triggering component 38, starting from FIG. 3, is pivoted further in the clockwise direction, the blocking lever 26 is further pivoted in the counter-clockwise direction by means of the counter-contact engagement of the bar 50 on the contact contour 60, until it reaches a mechanical stop 62 (see FIG. 4) on the closure latch 16. Starting from the contact of the blocking lever 26 on the mechanical stop 62, the closure latch 16, the blocking lever 26, and the triggering component 38 are braced relative to each other in the case of a further pivoting movement of the triggering component 38 in the clockwise direction, such that a pivoting movement of the triggering component 38 in the clockwise direction leads to a pivoting movement of the closure latch 16 in the clockwise direction (see FIG. 4) so that the hook-in opening 14 is gradually released.

In FIG. 5, the closure latch 16 is shown in its open position, a contact section 64 of the closure latch 16 resting on the counter stop face 30 of the hook body 12, so that a drawbar eye for coupling to the hook body 12 cannot reach and cannot damage the counter stop face 30.

At the same time, the blocking lever 26 with a latching recess 66 is latched on a latching counter-geometry 68 of the hook body under the effect of the compression spring 32 so that it can be overridden.

Starting from the position shown in FIG. 5, the closure latch 16 can be moved back into the closed position shown in FIG. 2 by pressing in the counter-clockwise direction while releasing the overridable latching between blocking lever 26 and hook body 12. Due to the pretensioning shown above of the individual components the closure latch 16 automatically locks in its closed position against renewed opening.

The opening actuation of the closure latch 16 can be carried out with one hand, as was explained above.

FIGS. 6 to 10 show a second embodiment of an inventive hook coupling. Identical or functionally identical components of the second embodiment have been designated with the same reference numbers as corresponding components of the first embodiment, but increased by the numer 100. The second embodiment will be described below only to the extent that it differs from the first embodiment.

The most essential difference between the first and the second embodiment lies in the fact that the triggering component 138 is hinged on the closure latch 116 such that it can be pivoted about a triggering-component pivoting axis 119. On top of this, the triggering component 136 can be moved, not as in the first embodiment in the clockwise direction, but in the counter-clockwise direction from the basic position shown in FIG. 6 into a triggering position that releases the blocking lever 126 for moving out of the blocking position.

The triggering component 138 is pretensioned by a torsion spring 148 into the basic position shown in FIG. 6. An end leg of the torsion spring 148 is in this case supported on a plastic buffer 151 connected to the triggering component 136 while another, opposite end leg of the torsion spring 148 is supported on the closure latch 116.

The plastic buffer 151 exhibits a bulge 153 that serves as a cam device and, like in the case of the first embodiment, is arranged in the basic position of the triggering component 138 at a distance from a contact contour 160 of the blocking lever 126, however reaches a contact engagement on the contact contour 160 when pivoting the triggering component 138 out of the basic position beyond the triggering position, and thus pivots the blocking lever 126 out of the blocking position in the direction towards the release position when the pivoting movement of the triggering component 138 is continued in the counter-clockwise direction.

A lid part 140 of the triggering component 138 is designed with a step to the pivoting axis 119 of the triggering component 138.

A free longitudinal end of the lid part 140 is designed as an extended covering that is intended to prevent the ingress of dirt into the closure latch.

On the top side of the blocking lever 126 and facing the lid part 140, a step-shaped design 145 is constructed that interacts with the radial step of the lid part 140 and provides for the blocking lever 126 not to be pivotable in the counter-clockwise direction from the blocking lever until the radial step of the lid part 140 has passed the step-shaped design 145 of the blocking lever 126.

The locking section 142 of the triggering component 138 has a hook-shaped design, the engagement face 142a of the locking section 142 being a part-cylindrical circumferential surface, the triggering-component pivoting axis 119 being the central axis. The same holds for the locking counter-section face 144a of the locking counter-section 144 of the blocking lever 126 that is located in the basic position of the triggering component 138 opposite the locking-section face 142a.

If it is desired to move the closure latch 116 from the closed position shown in FIG. 6 into the open position, at first the triggering component 138 has to be pivoted in the counter-clockwise direction until the blocking lever 126 is moved into the release position by the cam bulge 153 (see FIGS. 7 and 8 for this purpose).

Then the closure latch 116 can be simply moved in the clockwise direction from the closed position into the open position (see FIGS. 9 and 10).

In both embodiments shown, the basic position for the respective triggering component cannot be reached until the blocking lever is situated in the blocking position.

The invention claimed is:

1. A hook coupling comprising;
   a hook body;
   a hook-in opening;
   a closure latch which can be adjusted between an open position, in which the hook-in opening is at least open to such an extent that a drawbar eye can be hooked in at the hook body, to establish a positive connection therewith, and a closed position in which the hook-in opening is closed at least to such an extent that the drawbar eye hooked in at the hook body is secured to stay thereon;
   a blocking lever which is pivotable between a blocking position, in which it blocks an adjustment of the closure latch from the closed position towards the open position, and a release position in which it permits an adjustment of the closure latch from the closed position towards the open position, wherein the blocking lever is mounted pivotably in the closure latch so as to be displaceable between the blocking position and the release position; and
   a triggering device which, in a basic position, whenever the blocking lever is in the blocking position, prevents displacement of the blocking lever into the release position, and which, when actuated out of the basic position, permits displacement of the blocking lever into the release position;

wherein the triggering device comprises a triggering component which is mounted moveably on the closure latch, or on the hook body, or on a component connected rigidly to the hook body and which is moveable between the basic position and a triggering position in which the triggering component permits the displacement of the blocking lever into the release position;

wherein the triggering component is provided on the closure latch or on the hook body or on a component connected rigidly to the hook body so that it is pivotable between the basic position and the triggering position; and wherein the blocking lever and the triggering component are pivotable in opposite directions.

2. The hook coupling according to claim 1, wherein the triggering component is pretensioned into the basic position.

3. The hook coupling according to claim 2, further comprising at least one triggering-component pretensioning spring that is supported with one end on the triggering component and with a second end on a component of the blocking lever, the hook body, or the closure latch.

4. The hook coupling according to claim 3, wherein the second end of the at least one triggering-component pretensioning spring is supported on the closure latch.

5. The hook coupling according to claim 1, wherein the triggering component has a locking section that is arranged, in the basic position of the triggering component, to confront or rest on a locking counter-section of the blocking lever.

6. The hook coupling according to claim 5, wherein the locking section, in the triggering position, is remote from the locking counter-section.

7. The hook coupling according to claim 5, wherein, in the basic position of the triggering component, self-locking is achieved between the blocking lever and the triggering component such that movement of the blocking lever from the blocking position towards the release position does not cause any movement of the triggering component from the basic position towards the triggering position.

8. The hook coupling according to claim 3, wherein the blocking lever is designed so as to be partly rotationally-symmetric relative to a blocking-lever pivoting axis at a longitudinal end that is closer to the blocking-lever pivoting axis and the longitudinal end is surrounded over a predetermined angular range by an essentially complementary recess in a component that mounts the blocking lever.

9. The hook coupling according to claim 8, wherein the longitudinal end is surrounded over a predetermined angular range of approximately 140°-180°.

10. The hook coupling according to claim 1, wherein the triggering component further comprises a cam device that, at least during a section of a pivoting movement of the triggering component away from the basic position, entrains the blocking lever from the blocking position in the direction towards the release position.

11. The hook coupling according to claim 10, wherein the blocking lever can be displaced by the triggering component from the blocking position into the release position by means of the cam device.

12. The hook coupling according to claim 10, wherein the cam device serves as a pretensioning spring bearing on a side of the triggering component.

13. The hook coupling according to claim 10, wherein the cam device comprises a sliding face that, at least during a section of the pivoting movement of the triggering component from the basic position into the triggering position, arrives in a sliding-contact engagement on a contact contour of the blocking lever.

14. The hook coupling according to claim 1, wherein the closure latch is pivotable, and the closure latch and the triggering component are pivotable about a joint pivoting axis.

15. The hook coupling according to claim 1, wherein the blocking lever can be pretensioned towards the blocking position.

16. The hook coupling according to claim 1, wherein the closure latch comprises a mechanical stop that limits the displacement range of the blocking lever close to the release position against movement away from the blocking position.

17. The hook coupling according to claim 1, further comprising a counter stop face of the hook body, wherein the counter stop face is brought into a contact engagement with a stop face of the blocking lever, when the blocking lever is in the blocking position, and the counter stop face is also designed to contact a contact section of the closure latch wherein, the counter stop face limits the adjustability of the closure latch-close to the open position in the direction away from the closed position.

18. The hook coupling according to claim 1, wherein the triggering component is mounted moveably on the hook body.

19. A hook coupling comprising:
a hook body;
a hook-in opening;
a closure latch which can be adjusted between an open position, in which the hook-in opening is at least open to such an extent that a drawbar eye can be hooked in at the hook body, to establish a positive connection therewith, and a closed position in which the hook-in opening is closed at least to such an extent that the drawbar eye hooked in at the hook body is secured to stay thereon;
a blocking lever which is pivotable between a blocking position, in which it blocks an adjustment of the closure latch from the closed position towards the open position, and a release position in which it permits an adjustment of the closure latch from the closed position towards the open position; and
a triggering device which, in a basic position, whenever the blocking lever is in the blocking position, prevents displacement of the blocking lever into the release position, and which, when actuated out of the basic position, permits displacement of the blocking lever into the release position;
wherein the triggering device comprises a triggering component which is mounted moveably on the closure latch, or on the hook body, or on a component connected rigidly to the hook body and which is moveable between the basic position and a triggering position in which the triggering component permits the displacement of the blocking lever into the release position;
wherein the triggering component is provided on the closure latch or on the hook body or on a component connected rigidly to the hook body so that it is pivotable between the basic position and the triggering position; and
wherein the closure latch comprises a mechanical stop that limits the displacement range of the blocking lever close to the release position against movement away from the blocking position.

20. A hook coupling comprising;
a hook body;
a hook-in opening;

a closure latch which can be adjusted between an open position, in which the hook-in opening is at least open to such an extent that a drawbar eye can be hooked in at the hook body, to establish a positive connection therewith, and a closed position in which the hook-in opening is closed at least to such an extent that the drawbar eye hooked in at the hook body is secured to stay thereon, wherein the closure latch is pivotable;

a blocking lever which is pivotable between a blocking position, in which it blocks an adjustment of the closure latch from the closed position towards the open position, and a release position in which it permits an adjustment of the closure latch from the closed position towards the open position; and a triggering device which, in a basic position, whenever the blocking lever is in the blocking position, prevents displacement of the blocking lever into the release position, and which, when actuated out of the basic position, permits displacement of the blocking lever into the release position;

wherein the triggering device comprises a triggering component which is mounted moveably on the closure latch, or on the hook body, or on a component connected rigidly to the hook body and which is moveable between the basic position and a triggering position in which the triggering component permits the displacement of the blocking lever into the release position;

wherein the triggering component is provided on the closure latch or on the hook body or on a component connected rigidly to the hook body so that it is pivotable between the basic position and the triggering position;

wherein the blocking lever and the triggering component are pivotable in opposite directions; and wherein the closure latch and the triggering component are pivotable about a joint pivoting axis.

21. A hook coupling comprising;
a hook body;
a hook-in opening;
a closure latch which can be adjusted between an open position, in which the hook-in opening is at least open to such an extent that a drawbar eye can be hooked in at the hook body, to establish a positive connection therewith, and a closed position in which the hook-in opening is closed at least to such an extent that the drawbar eye hooked in at the hook body is secured to stay thereon;

a blocking lever which is pivotable between a blocking position, in which it blocks an adjustment of the closure latch from the closed position towards the open position, and a release position in which it permits an adjustment of the closure latch from the closed position towards the open position;

a triggering device which, in a basic position, whenever the blocking lever is in the blocking position, prevents displacement of the blocking lever into the release position, and which, when actuated out of the basic position, permits displacement of the blocking lever into the release position;

wherein the triggering device comprises a triggering component which is mounted moveably on the closure latch, or on the hook body, or on a component connected rigidly to the hook body and which is moveable between the basic position and a triggering position in which the triggering component permits the displacement of the blocking lever into the release position;

wherein the triggering component is provided on the closure latch or on the hook body or on a component connected rigidly to the hook body so that it is pivotable between the basic position and the triggering position; and a counter stop face of the hook body, wherein the counter stop face is brought into a contact engagement with a stop face of the blocking lever, when the blocking lever is in the blocking position, and the counter stop face is also designed to contact a contact section of the closure latch wherein, the counter stop face limits the adjustability of the closure latch close to the open position in the direction away from the closed position.

22. A hook coupling comprising:
a hook body;
a hook-in opening;
a closure latch which can be adjusted between an open position, in which the hook-in opening is at least open to such an extent that a drawbar eye can be hooked in at the hook body, to establish a positive connection therewith, and a closed position in which the hook-in opening is closed at least to such an extent that the drawbar eye hooked in at the hook body is secured to stay thereon;

a blocking lever which is pivotable between a blocking position, in which it blocks an adjustment of the closure latch from the closed position towards the open position, and a release position in which it permits an adjustment of the closure latch from the closed position towards the open position, wherein the blocking lever is mounted pivotably in the closure latch so as to be displaceable between the blocking position and the release position; and a triggering device which, in a basic position, whenever the blocking lever is in the blocking position, prevents displacement of the blocking lever into the release position, and which, when actuated out of the basic position, permits displacement of the blocking lever into the release position;

wherein the triggering device comprises a triggering component which is mounted moveably on the closure latch, or on the hook body, or on a component connected rigidly to the hook body and which is moveable between the basic position and a triggering position in which the triggering component permits the displacement of the blocking lever into the release position;

wherein the triggering component is provided on the closure latch or on the hook body or on a component connected rigidly to the hook body so that it is pivotable between the basic position and the triggering position;

wherein the triggering component has a locking section that is arranged, in the basic position of the triggering component, to confront or rest on a locking counter-section of the blocking lever; and wherein the locking section, in the triggering position, is remote from the locking counter-section.

23. A hook coupling comprising:
a hook body;
a hook-in opening;
a closure latch which can be adjusted between an open position, in which the hook-in opening is at least open to such an extent that a drawbar eye can be hooked in at the hook body, to establish a positive connection therewith, and a closed position in which the hook-in opening is closed at least to such an extent that the drawbar eye hooked in at the hook body is secured to stay thereon;

a blocking lever which is pivotable between a blocking position, in which it blocks an adjustment of the closure latch from the closed position towards the open position, and a release position in which it permits an adjustment of the closure latch from the closed position towards the open position, wherein the blocking lever is mounted pivotably in the closure latch so as to be displaceable between the blocking position and the release position; and a triggering device which, in a basic position, whenever the blocking lever is in the blocking position, prevents displacement of the blocking lever into the release position, and which, when actuated out of the basic position, permits displacement of the blocking lever into the release position;

wherein the triggering device comprises a triggering component which is mounted moveably on the closure latch, or on the hook body, or on a component connected rigidly to the hook body and which is moveable between the basic position and a triggering position in which the triggering component permits the displacement of the blocking lever into the release position;

wherein the triggering component is provided on the closure latch or on the hook body or on a component connected rigidly to the hook body so that it is pivotable between the basic position and the triggering position; and wherein the triggering component further comprises a cam device that, at least during a section of a pivoting movement of the triggering component away from the basic position, entrains the blocking lever from the blocking position in the direction towards the release position.

24. The hook coupling according to claim 23, wherein the blocking lever can be displaced by the triggering component from the blocking position into the release position by means of the cam device.

25. The hook coupling according to claim 23, wherein the cam device serves as a pretensioning spring bearing on a side of the triggering component.

26. The hook coupling according to claim 23, wherein the cam device comprises a sliding face that, at least during a section of the pivoting movement of the triggering component from the basic position into the triggering position, arrives in a sliding-contact engagement on a contact contour of the blocking lever.

27. A hook coupling comprising:
a hook body;
a hook-in opening;
a closure latch which can be adjusted between an open position, in which the hook-in opening is at least open to such an extent that a drawbar eye can be hooked in at the hook body, to establish a positive connection therewith, and a closed position in which the hook-in opening is closed at least to such an extent that the drawbar eye hooked in at the hook body is secured to stay thereon;
a blocking lever which is pivotable between a blocking position, in which it blocks an adjustment of the closure latch from the closed position towards the open position, and a release position in which it permits an adjustment of the closure latch from the closed position towards the open position, wherein the blocking lever is mounted pivotably in the closure latch so as to be displaceable between the blocking position and the release position; and
a triggering device which, in a basic position, whenever the blocking lever is in the blocking position, prevents displacement of the blocking lever into the release position, and which, when actuated out of the basic position, permits displacement of the blocking lever into the release position;

wherein the triggering device comprises a triggering component which is mounted moveably on the closure latch, or on the hook body, or on a component connected rigidly to the hook body and which is moveable between the basic position and a triggering position in which the triggering component permits the displacement of the blocking lever into the release position;

wherein the triggering component is provided on the closure latch or on the hook body or on a component connected rigidly to the hook body so that it is pivotable between the basic position and the triggering position; and wherein the closure latch is pivotable, and the closure latch and the triggering component are pivotable about a joint pivoting axis.

28. A hook coupling comprising:
a hook body;
a hook-in opening;
a closure latch which can be adjusted between an open position, in which the hook-in opening is at least open to such an extent that a drawbar eye can be hooked in at the hook body, to establish a positive connection therewith, and a closed position in which the hook-in opening is closed at least to such an extent that the drawbar eye hooked in at the hook body is secured to stay thereon;
a blocking lever which is pivotable between a blocking position, in which it blocks an adjustment of the closure latch from the closed position towards the open position, and a release position in which it permits an adjustment of the closure latch from the closed position towards the open position, wherein the blocking lever is mounted pivotably in the closure latch so as to be displaceable between the blocking position and the release position; and
a triggering device which, in a basic position, whenever the blocking lever is in the blocking position, prevents displacement of the blocking lever into the release position, and which, when actuated out of the basic position, permits displacement of the blocking lever into the release position;

wherein the triggering device comprises a triggering component which is mounted moveably on the closure latch, or on the hook body, or on a component connected rigidly to the hook body and which is moveable between the basic position and a triggering position in which the triggering component permits the displacement of the blocking lever into the release position;

wherein the triggering component is provided on the closure latch or on the hook body or on a component connected rigidly to the hook body so that it is pivotable between the basic position and the triggering position; and wherein the closure latch comprises a mechanical stop that limits the displacement range of the blocking lever close to the release position against movement away from the blocking position.

29. A hook coupling comprising:
a hook body;
a hook-in opening;
a closure latch which can be adjusted between an open position, in which the hook-in opening is at least open to such an extent that a drawbar eye can be hooked in at the hook body, to establish a positive connection therewith, and a closed position in which the hook-in opening is closed at least to such an extent that the drawbar eye hooked in at the hook body is secured to stay thereon;

a blocking lever which is pivotable between a blocking position, in which it blocks an adjustment of the closure latch from the closed position towards the open position, and a release position in which it permits an adjustment of the closure latch from the closed position towards the open position, wherein the blocking lever is mounted pivotably in the closure latch so as to be displaceable between the blocking position and the release position;

a triggering device which, in a basic position, whenever the blocking lever is in the blocking position, prevents displacement of the blocking lever into the release position, and which, when actuated out of the basic position, permits displacement of the blocking lever into the release position; and a counter stop face of the hook body, wherein the counter stop face is brought into a contact engagement with a stop face of the blocking lever, when the blocking lever is in the blocking position, and the counter stop face is also designed to contact a contact section of the closure latch wherein, the counter stop face limits the adjustability of the closure latch close to the open position in the direction away from the closed position; and wherein the triggering device comprises a triggering component which is mounted moveably on the closure latch, or on the hook body, or on a component connected rigidly to the hook body and which is moveable between the basic position and a triggering position in which the triggering component permits the displacement of the blocking lever into the release position; and wherein the triggering component is provided on the closure latch or on the hook body or on a component connected rigidly to the hook body so that it is pivotable between the basic position and the triggering position.

30. A hook coupling comprising:

a hook body;

a hook-in opening;

a closure latch which can be adjusted between an open position, in which the hook-in opening is at least open to such an extent that a drawbar eye can be hooked in at the hook body, to establish a positive connection therewith, and a closed position in which the hook-in opening is closed at least to such an extent that the drawbar eye hooked in at the hook body is secured to stay thereon;

a blocking lever which is pivotable between a blocking position, in which it blocks an adjustment of the closure latch from the closed position towards the open position, and a release position in which it permits an adjustment of the closure latch from the closed position towards the open position, wherein the blocking lever is mounted pivotably in the closure latch so as to be displaceable between the blocking position and the release position; and a triggering device which, in a basic position, whenever the blocking lever is in the blocking position, prevents displacement of the blocking lever into the release position, and which, when actuated out of the basic position, permits displacement of the blocking lever into the release position;

wherein the triggering device comprises a triggering component which is mounted moveably on the closure latch, or on the hook body, or on a component connected rigidly to the hook body and which is moveable between the basic position and a triggering position in which the triggering component permits the displacement of the blocking lever into the release position;

wherein the triggering component is provided on the closure latch or on the hook body or on a component connected rigidly to the hook body so that it is pivotable between the basic position and the triggering position; and wherein the triggering component is mounted moveably on the hook body.

* * * * *

UNITED STATES PATENT AND TRADEMARK OFFICE
CERTIFICATE OF CORRECTION

PATENT NO.       : 8,684,391 B2                                                    Page 1 of 1
APPLICATION NO. : 12/673373
DATED            : April 1, 2014
INVENTOR(S)      : Udo Szczepanek It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this

Twenty-ninth Day of September, 2015

Michelle K. Lee
*Director of the United States Patent and Trademark Office*